United States Patent [19]

Tanaka

[11] Patent Number: 4,905,136
[45] Date of Patent: Feb. 27, 1990

[54] POWER SUPPLYING APPARATUS

[75] Inventor: Shigeru Tanaka, Ootawara, Japan

[73] Assignee: Kabushiki Kaisha Toshiba, Kawasaki, Japan

[21] Appl. No.: 277,247

[22] Filed: Nov. 29, 1988

[30] Foreign Application Priority Data

Nov. 30, 1987 [JP] Japan ................................. 62-29932

[51] Int. Cl.$^4$ ............................................. H02M 7/00
[52] U.S. Cl. ..................................... 363/124; 363/24; 363/95
[58] Field of Search .................... 363/16–26, 363/41, 95–98, 124, 131–136; 318/808–811

[56] References Cited

U.S. PATENT DOCUMENTS

| 4,050,006 | 9/1977 | Stich | 363/124 X |
| 4,251,857 | 2/1981 | Shelly | 363/124 X |
| 4,661,896 | 4/1987 | Kobayashi et al. | 363/124 X |
| 4,667,283 | 5/1987 | Seki et al. | 363/124 X |
| 4,779,182 | 10/1988 | Mickal et al. | 363/124 X |

Primary Examiner—Patrick R. Salce
Assistant Examiner—Emanuel Todd Voeltz
Attorney, Agent, or Firm—Cushman, Darby & Cushman

[57] ABSTRACT

The output of an AC power source is converted into DC power through a rectifying stack and an electrolytic capacitor and this DC power is input to a chopper circuit, which includes a first switching element, flywheel diode and a coil. The chopper circuit adjusts the value of the power by changing the duty ratio of the first switching element. The output of the chopper circuit is supplied to an inverter circuit and is applied at the center tap of the primary winding of a transformer. The inverter circuit is of a voltage-oscillating type which includes the transformer, a capacitor and second and third switching elements. As the second and third switching elements are alternately switched on, the inverter circuit converts the received DC power into AC power as its output. The ON/OFF switching operation of the first through third switching elements is controlled by a control circuit in such a way that these switching elements have the same switching frequency and the middle timing of the ON duration of the first switching element of the chopper circuit coincides with a timing at which the ON duration of the second switching element of the inverter circuit is switched to the ON duration of the third switching element.

8 Claims, 3 Drawing Sheets

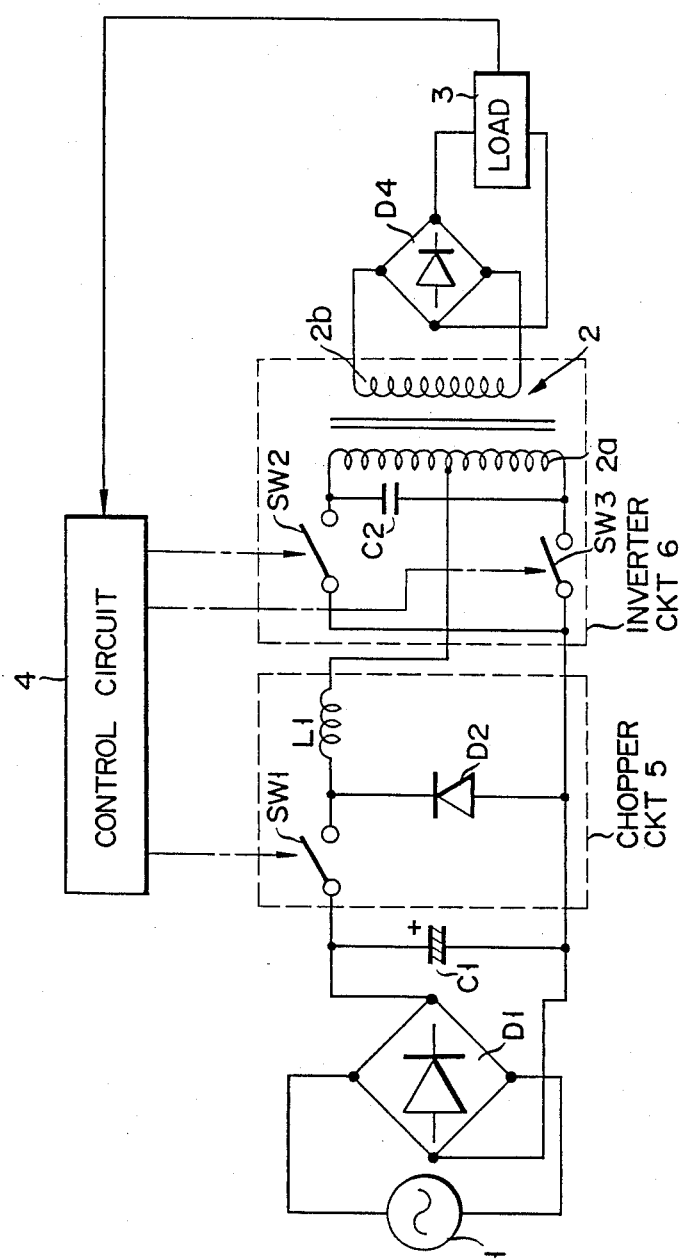
F I G. 1

POWER SUPPLYING APPARATUS

BACKGROUND OF THE INVENTION

1. Field of the Invention

The present invention relates to a power supplying apparatus which converts received DC power into AC power and supplies it to a load.

2. Description of the Related Art

A conventional type of a power supplying apparatus of this type comprises a chopper circuit, which converts DC power into pulse power through ON/OFF switching, adjusts the power level of the pulse power by changing the ON/OFF ratio (duty ratio) and smoothes the pulse power to output DC power, and an inverter circuit which is provided at the succeeding stage of the chopper circuit and converts the output of the chopper circuit into AC power by subjecting this output to ON/OFF switching at the duty ratio of 50%. Normally, the duty ratio of the chopper circuit is 50% or below, and the chopper circuit is rendered conductive during part of the period in which the inverter circuit is ON. The switching frequency of the chopper circuit is generally set to an integral multiple of the switching frequency of the inverter circuit. Provided the switching frequency of the chopper circuit is set equal to that of the inverter circuit or less than twice the latter switching frequency, when the ON duration of the chopper circuit slightly shifts, the chopper circuit will not be rendered conductive during the ON duration of the inverter circuit so that no voltage is applied to the inverter circuit from the chopper circuit. This renders the operation of the inverter circuit unstable Further, with the inverter circuit being of two-arm type, when the ON duration of the chopper circuit slightly shift, there would appear some difference in power distributed to the individual arms of the inverter circuit, which may also render the operation of the inverter circuit unstable.

As a larger transformer needs to be used in the inverter circuit for low-frequency operation, the inverter circuit should be operated at a high frequency in order to make this circuit compact. For this purpose, there is a demand to increase the switching frequency of the inverter circuit. In this case, the chopper circuit needs to be operated at a frequency which is an integral multiple of the switching frequency of the inverter circuit. The operation frequency of the chopper circuit is restricted by the switching ability of the switching elements in this circuit. Therefore, increasing the frequency of the inverter circuit is influenced and restricted by the switching frequency of the chopper circuit, so that the frequency of the inverter circuit cannot be increased so much.

SUMMARY OF THE INVENTION

Accordingly, it is an object of this invention to provide a power supplying apparatus which can permit the switching frequency of the inverter circuit to be increased to the maximum switching frequency of the chopper circuit even though the inverter circuit is provided at the succeeding stage of the chopper circuit and can be made compact.

According to one aspect of this invention, there is provided a power supplying apparatus which comprises a chopper circuit, having an output terminal, for switching DC power to adjust power, an inverter circuit, coupled to the output terminal of the chopper circuit, for switching an output of the chopper circuit to apply an AC output of a desired frequency to a load, and a control circuit for controlling switching operations of the chopper circuit and the inverter circuit in such a way that a switching frequency of the chopper circuit is set equal to a switching frequency of the inverter circuit and an ON duration of the chopper circuit is synchronized with an ON duration of the inverter circuit.

BRIEF DESCRIPTION OF THE DRAWINGS

FIG. 1 is a block diagram illustrating the arrangement of a power supplying apparatus according to one embodiment of this invention;

DETAILED DESCRIPTION OF THE PREFERRED EMBODIMENTS

Figure 2:
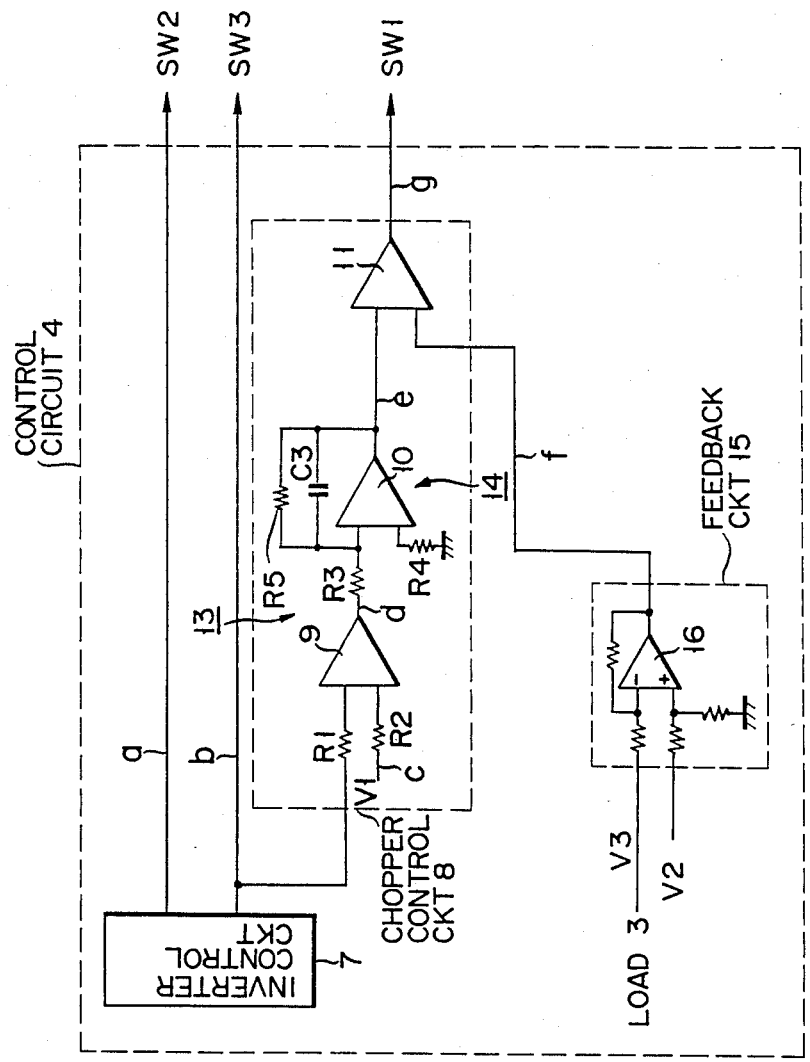
FIG. 2 is a detailed circuit diagram of a control circuit used in this embodiment.

In the embodiment shown in FIG. 1, the AC output of an AC power source 1 is rectified by a rectifier stack D1 and smoothed by an electrolytic capacitor C1 to be DC power, and this DC power is input to a chopper circuit 5. This chopper circuit 5 comprises a first switching element SW1, a flywheel diode D2 and a coil L1. The DC power input to chopper circuit 5 is coupled to one terminal of first switching element SW1 which has the other terminal coupled to a cathode of flywheel diode D2 and one end of coil L1. Flywheel diode D2 has its anode coupled to (−) terminal of electrolytic capacitor C1.

The other end of coil L1, which serves as an output terminal of chopper circuit 5, is coupled to a center tap of a primary winding 2a of a transformer 2 with a capacitor C2 coupled in parallel to the primary winding 2a. Primary winding 2a has its one end coupled to one terminal of a second switching element SW2 and has the other end coupled to one terminal of a third switching element SW3. The other terminals of switching elements SW2 and SW3 are coupled together to the aforementioned (−) terminal of electrolytic capacitor C1. Switching elements SW2 and SW3, capacitor C2 and transformer 2 constitute a voltage oscillating type inverter circuit 6. Alternately closing the switching elements SW2 and SW3 causes inverter circuit 6 to convert DC power into AC power as its output.

Since a load is driven by DC power in this embodiment, a rectifier is coupled to the output stage of inverter circuit 6. More specifically, both ends of a secondary winding 2b of transformer 2 are coupled to a load 3 through a rectifying diode stack D4. Load 3 may be an X-ray tube for use in an X-ray diagnostic apparatus, with a rectified output of diode stack D4 being applied between the anode and cathode (or filament) of the X-ray tube. The voltage applied to the X-ray tube is detected by a voltage-dividing resistor, etc. and is fed back as load information to a control circuit 4.

Control circuit 4 controls the ON/OFF switching operation of switching element SW1 of chopper circuit 5 and switching elements SW2 and SW3 of inverter circuit 6. In this embodiment, the switching frequencies of switching elements SW1 to SW3 are set to the same value, and the ON duration of switching element SW1 of chopper circuit 5 is so set that its middle timing coincides with the timing at which the ON duration of switching element SW2 of inverter circuit 6 is switched to the ON duration of switching element SW3.

FIG. 2 illustrates the detailed structure of control circuit 4, which comprises an inverter control circuit 7, a chopper control circuit 8 and a feedback circuit 15. Inverter control circuit 7 has an oscillator to produce a switching control signal a of a constant frequency for second switching element SW2 of inverter circuit 6 and another switching control signal b for third switching element SW3 of inverter circuit 6, the latter signal b having the same frequency as the former signal but in the inverted phase.

Chopper control circuit 8 comprises a triangular waveform generator 13 for generating a triangular waveform signal e based on one of switching control signals a and b (signal b in this case) from inverter control circuit 7 and a comparator 11 for comparing this triangular waveform signal e with a chopper duty control signal f from feedback circuit 15. This circuit 8 produces a switching control signal g for first switching element SW1 of chopper circuit 5. Triangular waveform generator 13 includes an operational amplifier 9, a resistor R1 through which the switching control signal b from inverter control circuit 7 is supplied to one input terminal of operational amplifier 9, a resistor R2 through which a reference voltage V1 that is the middle of the "H" and "L" levels of the switching control signal b is supplied to the other input terminal of the amplifier 9, and an integrator 14 for performing integration of the output signal d of the amplifier 9. Operational amplifier 9 has a function to amplify the switching control signal b. Integrator 14 includes an input resistor R3, an operational amplifier 10, a capacitor C3, and resistors R4 and R5; capacitor C3 and resistor R5 are coupled in parallel between one input terminal and an output terminal of operational amplifier 10 and resistor R4 coupled between the other input terminal of the amplifier 10 and a ground potential.

Feedback circuit 15, which is a typical differential amplifier constituted mainly by an operational amplifier 16, amplifies the difference between the load information representing an applied voltage detection signal V3 to load 3 (the detection signal of the anode-cathode voltage if load 3 is an X-ray tube) and a voltage setting signal (reference value) V2 to thereby provide the chopper duty control signal f.

A description will now be given of the operation of the embodiment with the above structure.

Figure 3:
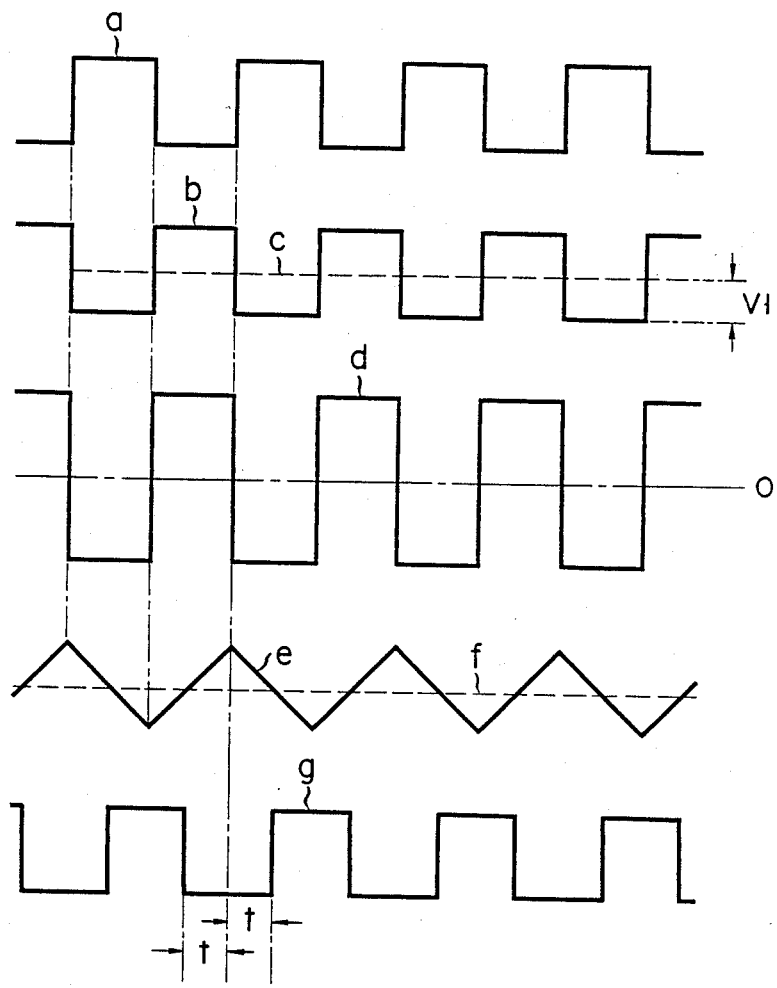
FIG. 3 is a signal waveform diagram illustrating the operation of the control circuit.

FIG. 3 illustrates the waveforms of main signals a to f in FIG. 2, with its horizontal axis indicating the time and the vertical axis the voltage. The AC output from AC power source 1 is rectified by rectifying stack D1 and smoothed to be DC power by capacitor C1, and this DC power is then input to chopper circuit 5. The switching output of switching element SW1 of chopper circuit 5 is supplied to inverter circuit 6 where an AC voltage (high voltage) is induced at the secondary winding 2b of transformer 2 by the alternate switching operation of switching elements SW2 and SW3 in accordance with the control signals a and b. This induced voltage is supplied through diode stack D4 to load 3.

Chopper control circuit 8 first amplifies the switching control signal b from inverter control circuit 7 to prepare the signal d, based on which the circuit 8 then generates the triangular waveform signal e having the same frequency as the signal d. Since the switching control signal b has the duty ratio of 50%, the triangular waveform signal e has the same inclination both in increasing and decreasing states. Then, chopper control circuit 8 compares the triangular waveform signal e with the chopper duty control signal f representing the difference between the applied voltage detection signal V3 to load 3 and the voltage setting signal (reference value) V2, and outputs, as the switching control signal g for chopper circuit 5, such a pulse signal as to have a "L" level when the triangular waveform signal e is greater than the chopper duty control signal f. Provided that the individual switching elements SW1, SW2, and SW3 are closed when the control signals g, a, and b are in the "L" level, the frequency at which switching element SW1 of chopper circuit 5 is closed is set equal to the frequency at which switching elements SW2 and SW3 of inverter circuit 6 are closed, and the ON duration of switching element SW1 is set in such a way that its middle timing coincides with the timing at which the ON duration of switching element SW2 is switched to the ON duration of switching element SW3. In other words, each half, t, of the ON duration of switching element SW1 of chopper circuit 5 overlaps the ON duration of the respective switching element SW2 or SW3 of inverter circuit 6. The pulse width of the chopper control signal g is controlled by the level of the chopper duty control signal f in such a way that power corresponding to the voltage setting signal V2 is supplied to the load. Even if the duty ratio of the chopper control signal g varies, the above-described relation between the switching cycles of the chopper circuit and inverter circuit does not change.

Although this invention has been described with reference to the above embodiment, it is in no way restricted to this particular example but can of cause be modified in various manners within the scope and spirit of the invention. For instance, instead of an X-ray tube operative on DC power, a load operative on AC power may be used as load 3.

As described above, since the switching of the chopper circuit is controlled in synchronism with the switching of the inverter circuit, the switching operation of both circuits can be performed at the same frequency even though the inverter circuit is provided at the succeeding stage of the chopper circuit. This can eliminate the need to set the switching frequency of the chopper circuit to be equal to or greater than twice the switching frequency of the inverter circuit. Accordingly, the switching frequency of the inverter circuit can be increased to the limit of the switching frequency (switching ability) of the switching elements, thus facilitating the high-frequency application and compactness of the inverter circuit.

What is claimed is:

1. An apparatus for converting input DC power into AC power and supplying said AC power to a load, said apparatus comprising:
   a chopper circuit, having an output terminal, for switching said DC power to adjust power;
   an inverter circuit, coupled to said output terminal of said chopper circuit, for switching an output of said chopper circuit to apply an AC output of a desired frequency to a load; and
   control means for controlling switching operations of said chopper circuit and said inverter circuit in such a way that a switching frequency of said chopper circuit is set equal to a switching frequency of said inverter circuit and an ON duration of said chopper circuit is synchronized with an ON duration of said inverter circuit, wherein said control means includes means for permitting a middle timing of an ON duration of said chopper circuit to coincide with an ON/OFF switching timing of said inverter circuit.

2. The apparatus according to claim 1, wherein said control means includes:
   means for generating an inverter control signal of a constant frequency for controlling the switching operation of said inverter circuit;
   means for generating a triangular waveform signal in synchronism with said inverter control signal;
   means for comparing said triangular waveform signal with a signal of a predetermined level; and
   means for generating a chopper control signal to control the switching operation of said chopper circuit in accordance with a result of comparing by said comparing means.

3. The apparatus according to claim 2, wherein said signal of said predetermined level is a signal representing a difference between a detected value of power supplied to said load and a set value of power to be supplied to said load.

4. The apparatus according to claim 1, wherein said inverter circuit is of a voltage-oscillating type.

5. The apparatus according to claim 4, wherein said inverter circuit includes two switching elements which are alternately switched on, a transformer supplied with outputs of said two switching elements, and a capacitor coupled in parallel to a primary winding of said transformer.

6. An X-ray tube driving apparatus comprising:
   a chopper circuit, having an output terminal, for switching DC power;
   an inverter circuit, coupled to said output terminal of said chopper circuit, for switching an output of said chopper circuit to output an AC output of a desired frequency;
   switching pulse generating means for supplying switching control pulses to said chopper circuit and said inverter circuit in such a way that a switching frequency of said chopper circuit is set equal to a switching frequency of said inverter circuit and a middle timing of an ON duration of said chopper circuit coincides with an ON/OFF switching timing of said inverter circuit;
   means for rectifying and applying an output of said inverter circuit to an X-ray tube; and
   control means for detecting power applied to said X-ray tube and controlling a duty ratio of said switching control pulse to said chopper circuit in accordance with a detection result.

7. The apparatus according to claim 6, wherein said switching pulse generating means includes:
   means for generating an inverter control signal of a constant frequency for controlling switching of said inverter circuit;
   means for generating a triangular waveform signal in synchronism with said inverter control signal;
   means for comparing said triangular waveform signal with a signal representing a difference between a detection value of said power supplied to said X-ray tube and a set value of power to be supplied to said X-ray tube; and
   means for generating a chopper control signal to control switching of said chopper circuit in accordance with a result of comparing by said comparing means.

8. The apparatus according to claim 6, wherein said inverter circuit is of a voltage-oscillating type.

* * * * *